No. 621,233. Patented Mar. 14, 1899.
A. W. ELLIS.
STOPPERING DEVICE FOR BOTTLES OR SIMILAR VESSELS.
(Application filed Dec. 29, 1897.)
(No Model.) 2 Sheets—Sheet 1.

Witnesses
H. B. Keefer
Bruce S. Elliott

Inventor
Arthur W. Ellis,
By
James L. Norris
Atty

No. 621,233. Patented Mar. 14, 1899.
A. W. ELLIS.
STOPPERING DEVICE FOR BOTTLES OR SIMILAR VESSELS.
(Application filed Dec. 29, 1897.)
(No Model.) 2 Sheets—Sheet 2.
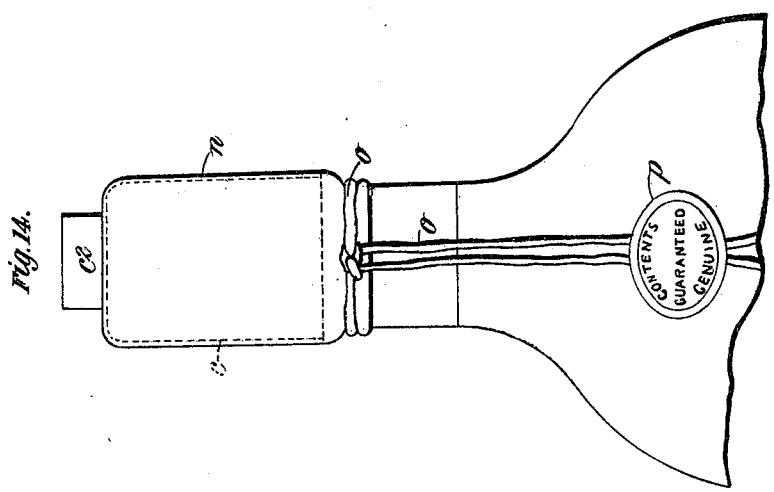
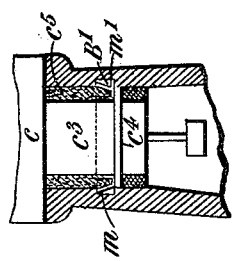
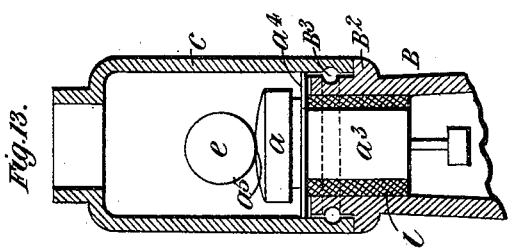
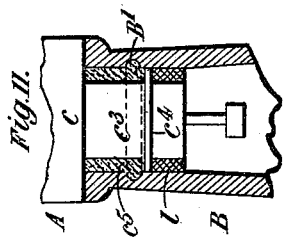

UNITED STATES PATENT OFFICE.

ARTHUR WILLIAM ELLIS, OF LONDON, ENGLAND.

STOPPERING DEVICE FOR BOTTLES OR SIMILAR VESSELS.

SPECIFICATION forming part of Letters Patent No. 621,233, dated March 14, 1899.

Application filed December 29, 1897. Serial No. 664,328. (No model.)

*To all whom it may concern:*

Be it known that I, ARTHUR WILLIAM ELLIS, chemical engineer, a subject of the Queen of Great Britain, residing at 5 Oakley Crescent, Chelsea, London, England, have invented certain new and useful Improvements in and Relating to Stoppering Devices for Bottles and Similar Vessels, (for which I have obtained patents in England, No. 15,149, dated July 8, 1896, and in France, No. 268,420, dated July 3, 1897,) of which the following is a specification, reference being had to the accompanying drawings.

This invention has reference to stoppering devices for bottles and similar receptacles, and is designed to prevent the perpetration of frauds by the refilling of bottles or receptacles originally containing wines, spirits, perfumes, or liquids of special brands or qualities with liquids of inferior quality.

To this end I provide a stoppering device consisting of an outer casing, inside of which is arranged a buoyant non-return valve. In combination with this valve I provide a ball and hollow cone or conical cup coöperating together in such a manner as to keep the valve on its seat even after the mouth of the bottle has been inclined downward through a very considerable angle. I may also provide a shield-plate, either alone or in combination with a perforated guard, to prevent the insertion of devices for raising the valve from its seat.

In order that my invention may be clearly understood and readily carried into effect, I will proceed to describe the same by aid of the accompanying drawings, in which—

Figure 1:
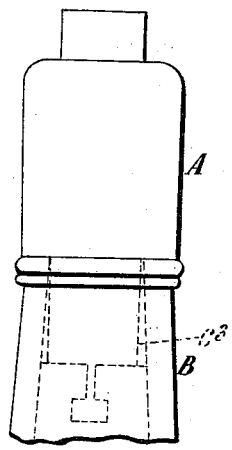
Figures 2, 3:
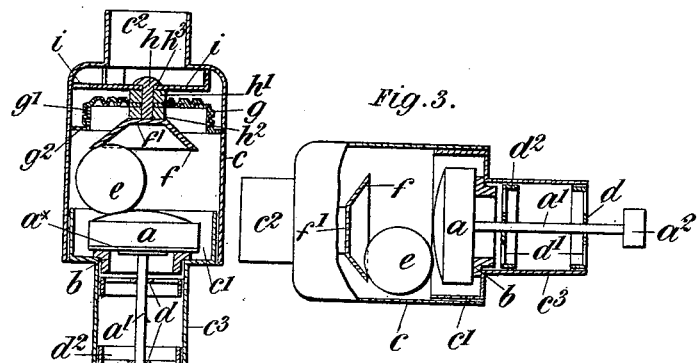
Figure 4:
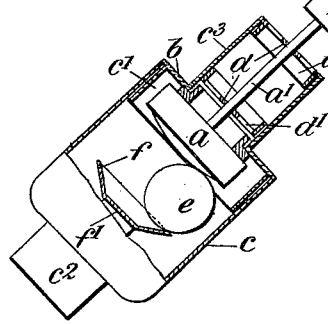
Figure 5:
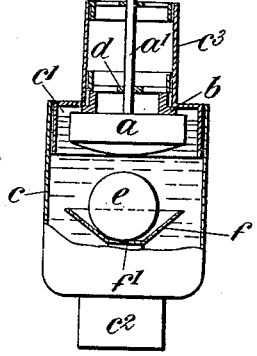
Figure 6:
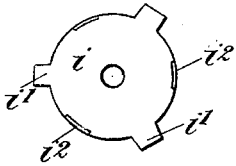
Figure 7:
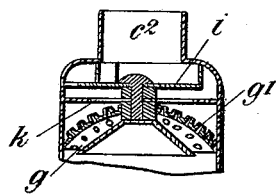
Figure 8:
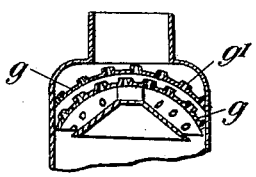
Figure 9:
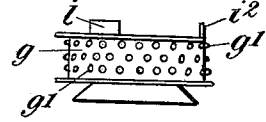

Figure 1 shows in side elevation one form of my improved stoppering device applied to the neck of a bottle. Fig. 2 is a vertical central section of the improved stoppering device. Figs. 3, 4, and 5 are vertical sections, partly in elevation, showing the parts of the said device in the positions they assume when the bottle is held at different angles. Fig. 6 is a plan of a detail hereinafter referred to. Figs. 7 and 8 are vertical sections showing two different forms of the perforated shield, and Fig. 9 is a side elevation showing another form thereof. Figs. 10, 11, and 12 show, partly in vertical section, various arrangements for securing the stoppering device in the mouth of the bottle. Fig. 13 shows a modified form of stoppering device. Fig. 14 shows one of my improved stoppering devices applied to a bottle-neck and provided with a capsule and sealed cork for insuring the genuineness of the contents.

A is the stoppering device, and B is the neck of the bottle or like receptacle.

$a$ is the buoyant non-return valve, and $b$ is the valve-seat. The said valve has a slightly-rounded upper surface and is formed of cork or is otherwise constructed so that its specific gravity is only slightly less than that of the liquid to be contained in the bottle or receptacle. The outer casing of the stoppering device is advantageously formed in two parts $c$ $c'$, the former of which has a tube $c^2$, adapted to serve as the outlet for the liquid and which may normally be closed by a cork or the like. The part $c'$ also has a tube $c^3$, adapted to enter the mouth of the bottle. The valve-seat $b$ is fitted in the upper part of this tube $c^3$, and its opening is of smaller area than the said tube, as this is found to facilitate the opening of the valve.

The valve $a$ being buoyant, it is desirable that the supply of fluid in the chamber containing said valve should be properly limited when the contents of the bottle are withdrawn in order to prevent the valve from being floated up into engagement with its seat when the bottle is inverted. If the opening surrounded by the valve-seat $b$ is of the same area as the tube $c^3$ or of greater area, the tendency will be to discharge fluid through said tube in the casing $c$ so rapidly as to cause frequent seating of the valve and consequent obstruction to the ready withdrawal of the contents of the bottle. This will be readily understood from Fig. 5, if it be supposed that the horizontal shading-lines represent water in said casing. The valve $a$ is provided with a stem $a'$, which works freely in guides $d$, connected by arms $d'$ to a ring $d^2$, secured inside the tube $c^3$. The stem $a'$ carries at its lower end a suitable weight $a^2$, which serves to regulate the buoyancy of the valve.

$a^\times$ is a leather disk or facing, with which the valve $a$ may in some cases be provided.

$e$ is the ball-weight for keeping the valve on its seat. This ball may be formed, say, of enameled metal or glass, as may also other parts of the stoppering device where practicable.

$f$ is the hollow cone or conical cup coöperating with the ball-weight, the edges thereof being sufficiently close to the surface of the valve to prevent the ball-weight passing between them. It will be seen that the wall of the cone or cup is inclined at a very wide angle, in the present case more than ninety degrees, and a flat or truncated portion $f'$ is provided, on which the ball-weight can rest without fear of its sticking in the cone by the capillary action of any liquid which may adhere to it.

$g$ is the perforated guard, which is formed of thin sheet metal provided with holes $g'$ for the passage of liquid. These holes are punched from the inner side, so as to leave their burred edges on the outer side, thus effectually preventing the insertion of wires or devices for lifting the valve off its seat. The perforated guard, as shown in Fig. 2, has a ring or flange $g^2$, which is connected to the inside of the casing $c$.

$h$ is a short stem or rivet secured in the portion $f'$ of the cone and having a pair of washers $h'$ $h^2$ above and below the guard $h$.

$i$ is the shield-plate, which is situated between the upper washer $h'$ and the head $h^3$ of the stem, this plate having lateral projections $i'$ and vertical projections $i^2$, as shown more clearly in Fig. 6, whereby it is secured to the casing of the stopper.

In the modification shown in Fig. 7 an annular disk $k$ is arranged beneath the shield-plate $i$, and the perforated guard $g$ is of dome shape, while in Fig. 8 two dome-shaped guards are employed, and in Fig. 9 the perforated guard is cylindrical, and its wall extends up to the shield-plate $i$.

In some cases I may dispense with the perforated guard and employ only a shield-plate and an annular disk, arranged as shown at $i$ and $k$, Fig. 7.

It will be seen that whichever arrangement of guard or shield be employed the passage through the stoppering device is indirect or is baffled at various points, and care is taken to make the area of the passage increase successively from the valve-seat at each point where the baffling occurs. For instance, the area of the annular passage between the edge of the valve $a$ and the casing of the stoppering device would be slightly larger than the area of the valve-opening, but not so large as the area between the edge of the cone and the casing. Again, the collective area of the holes in the guard $g$ should exceed that of the passage around the cone, while the passage around the plate $i$ must be larger than the area of the holes. The purpose of thus arranging the passage with an increasing area is to obviate any appreciable check or resistance to the outflowing liquid, this being a matter of importance owing to the sensitiveness of the buoyant valve $a$, which valve would be immediately closed if the passage were obstructed even temporarily and would thus render the outflow irregular or spasmodic. In other words, the passages in front of the buoyant valve are made with a constantly-increasing area of discharge, while the passage behind said valve is decreased in area, both constructions being for the same reason—viz., that the increased area may give free and rapid discharge from the chamber containing the buoyant valve, while the decreased area of the valved passage prevents too rapid inflow to said chamber.

The action of the stoppering device is as follows: When the bottle is in a vertical position, as in Figs. 1 and 2, the ball-weight $e$ acts by its gravity directly on the buoyant valve and tends to keep it on its seat. When the bottle is turned horizontally, however, (see Fig. 3,) the ball-weight rolls to the lower side and becomes wedged between the hollow cone and the valve, so keeping the latter closed. This wedging action continues, owing to the wideness of the angle of the cone, even after the bottle has been inverted through a considerable angle—say to the extent of forty-five degrees, as in Fig. 4—and it is not till the bottle is inclined beyond this degree that the ball-weight rolls onto the portion $f'$ of the cone clear of the valve, as in Fig. 5. If the bottle be full, the contents will thus be free to flow out. If, however, the bottle be empty and it has had a vacuum formed in it and been immersed in liquid with the object of refilling it fraudulently, this object will be defeated, since the valve is not released by the ball-weight until the said valve is in a position to be floated onto its seat by liquid entering the casing $c$. Obviously if the valve were released at a small angle of inclination the buoyancy of the valve would tend to cause its stem to bind in the guides $d$, and the valve would not therefore close properly, so that the bottle possibly might be refilled.

The stoppering device may be secured by friction in the neck B of the bottle by means of a cork ring, liner, or sleeve $l$, (see Fig. 10,) fitted in the mouth of the bottle or around the portion $c^3$ of the device, and I prefer when placing the stoppering device in position to coat the under surface thereof with cement, so that a thin layer of the latter may exist between it and the edge of the bottle.

In some cases the device may be secured in such a manner as to prevent its removal otherwise than by breaking the bottle-neck. This may be effected in various ways. For instance, in the arrangement shown in Fig. 11 an internal groove $B'$ is formed inside the neck B, and the portion $c^3$ of the device carries a ring or flange $c^4$, beneath which a cork ring $l$ is arranged, while the space above the ring or flange $c^4$ is filled with cement $c^5$. In Fig. 12 a similar arrangement is employed; but in this case the groove $B'$ is of rectangular section, and spring-catches $m$ $m'$ are secured to the portion $c^3$ of the stoppering device, these catches snapping into or engaging in the groove when the device is in position, and so preventing the said device from being removed except by breaking the neck of the bottle.

In the arrangement shown in Fig. 13 the casing $c$ of the stoppering device is made of glass, porcelain, or other suitable material and rests upon a flange $B^2$ on the bottle-neck, the guard and cone, which are not shown, being secured in the casing in any convenient manner. A cavity $B^3$, formed partly in the casing and partly in the bottle-neck, serves to receive the cement for securing the casing in position. The valve $a$ is similar to that in the previous arrangement and is fitted in a tubular casing $a^3$, the upper edge of which forms a valve-seat. This tubular casing is secured in the bottle-neck by a cork liner $l$ and carries a flat ring or washer $a^4$, which rests upon a bed of cement on the mouth of the bottle. To keep the ball-weight $e$ in position while the casing $c$ is being secured in place, a recess $a^5$ is formed in the upper surface of the valve for the said ball-weight to rest in. In some cases instead of simply cementing the glass casing to the bottle-neck they may be provided on their adjacent surfaces with male and female threads whereby they may be screwed together.

Any of the preceding forms of my improved stoppering device may be provided with a capsule $n$, having an opening at its upper part through which the tube $c^2$ extends. The purpose of this is to enable the contents of the bottle or receptacle to be removed without injury to the capsule, which is intended to act as a safeguard against the stoppering device as a whole being removed or tampered with. Around the capsule is tied a wire or a cord $o$ in the manner shown in Fig. 14, the ends of this wire or cord being secured by a soft-metal or other seal $p$ after the bottle has been filled and capsuled. Consequently so long as the capsule remains intact it serves as a guarantee that the contents of the bottle are genuine.

What I claim is—

1. In a bottle-stoppering device, the combination with a buoyant valve arranged in a casing having an inlet at the bottom controlled by said valve and an outlet at the top, of a ball-weight normally resting upon the convex top of said valve to hold the latter upon its seat, a hollow cone overhanging the ball-weight to hold the latter upon the valve and to receive the ball-weight when the valve unseats, and a guard-plate having perforations punched from its lower face so that the burs project from the upper face, the aggregate discharge area of said perforations being greater than the annular discharge area around the hollow cone, and the latter area being greater than that between the edge of the valve and the casing while the area of the inlet controlled by the valve exceeds that of the opening surrounded by the valve-seat, substantially as described.

2. In a stoppering device for bottles, the combination with a buoyant valve arranged in a casing to control an inlet-tube at the bottom of said casing, said valve having a stem which is movable in guide-rings in the inlet-tube, of a ball-weight resting upon the convex upper face of said valve, a hollow cone overhanging the ball-weight and of such angularity that when the bottle is turned to discharge its contents said ball-valve will rest within the closed truncated end of said cone and will have contact with the conical wall at a single point only and a guard-plate above and giving support to the hollow cone, said plate having perforations punched therein the burs from said perforations rising above the upper face of the plate, the area of each passage in front of the buoyant valve being greater than the area of the next passage in the rear, substantially as described.

In testimony whereof I have hereunto set my hand this 3d day of December, 1897.

ARTHUR WILLIAM ELLIS.

Witnesses:
H. ASHLEY-NORRIS,
A. B. CROFTS.